(No Model.) 2 Sheets—Sheet 1.

W. E. STUBBS.
MECHANISM FOR INDICATING TRAVEL OF BICYCLES, &c.

No. 601,686. Patented Apr. 5, 1898.

Witnesses.
Walter C. Pusey.
A. R. Groupe

Inventor.
William E. Stubbs,
per Joshua Pusey,
Attorney.

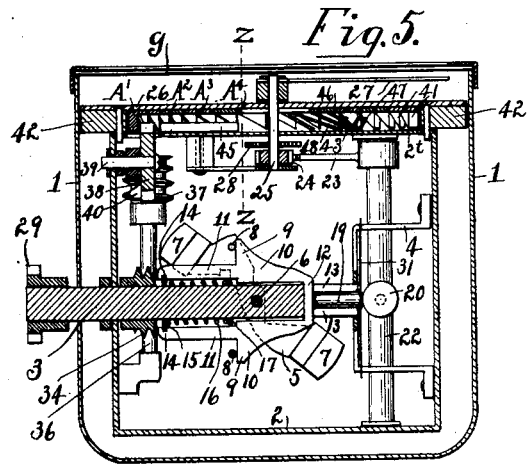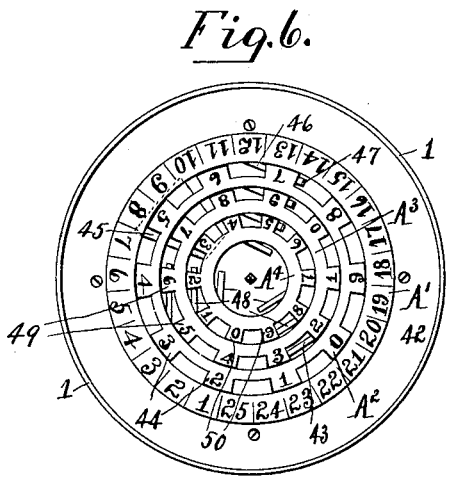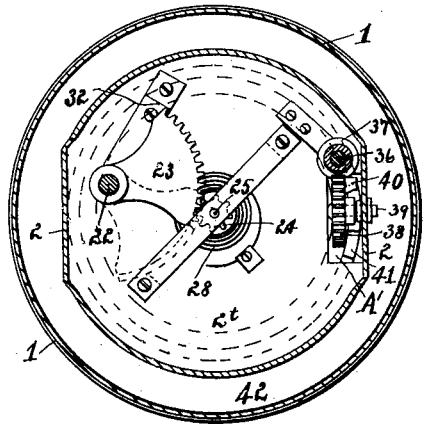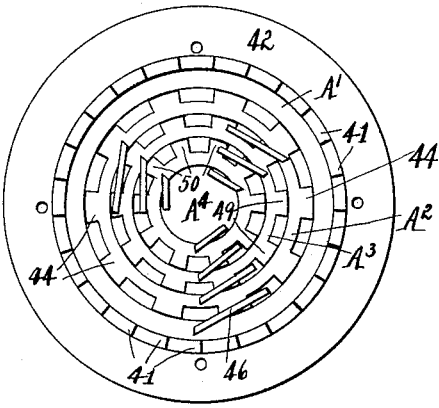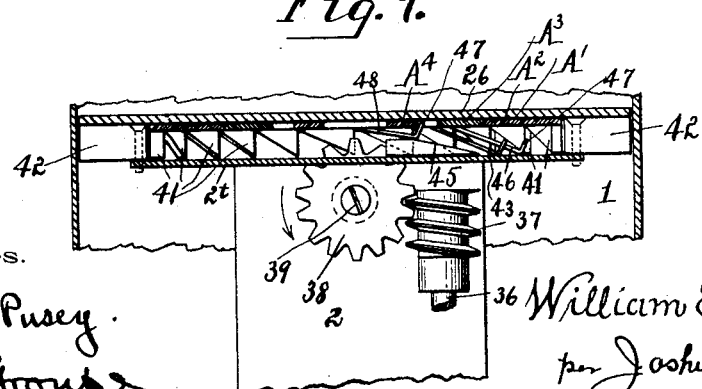

UNITED STATES PATENT OFFICE.

WILLIAM E. STUBBS, OF CHESTER, PENNSYLVANIA.

MECHANISM FOR INDICATING TRAVEL OF BICYCLES, &c.

SPECIFICATION forming part of Letters Patent No. 601,686, dated April 5, 1898.

Application filed December 23, 1896. Serial No. 616,794. (No model.)

*To all whom it may concern:*

Be it known that I, WILLIAM E. STUBBS, a citizen of the United States, residing at the city of Chester, in the county of Delaware and State of Pennsylvania, have invented certain new and useful Improvements in Mechanism for Indicating Travel of Bicycles and other Wheeled Vehicles, of which the following is a full, clear, and exact description, reference being had to the accompanying drawings, of which—

Figure 1:
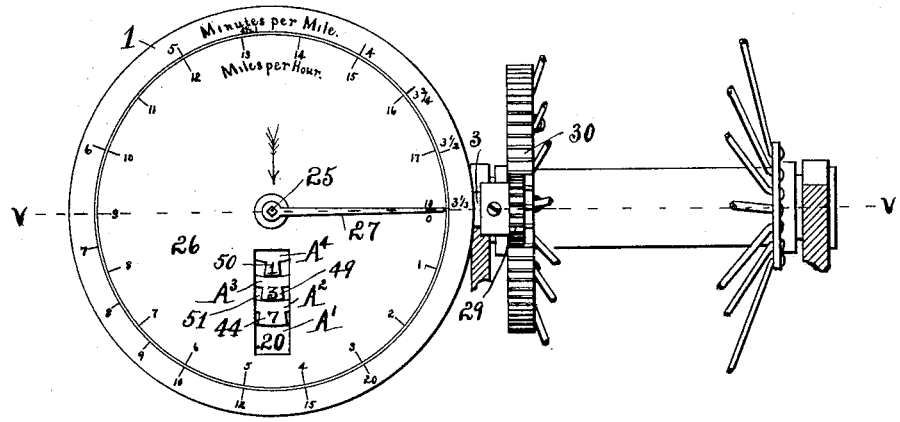
Figure 2:
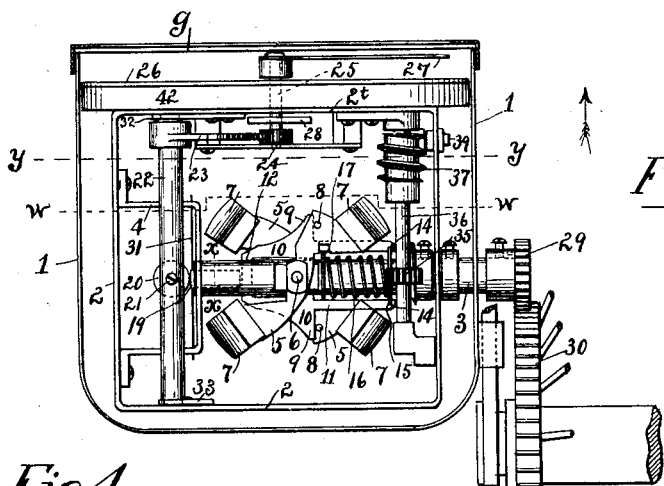
Figure 4:
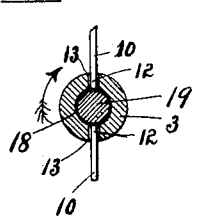
Figure 3:
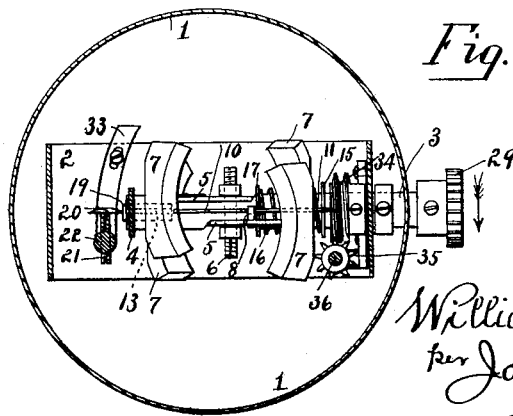

Figure 1, Sheet 1, is a plan view of my invention as connected to a bicycle-wheel. Fig. 2 is a side elevation, the casing being broken away. Fig. 3 is a horizontal section on line $w\,w$, Fig. 2. Fig. 4 is a vertical section on line $x\,x$, Fig. 2, through the main shaft, sliding pin, &c. Fig. 5, Sheet 2, is a section on line $v\,v$, Fig. 1, looking in the direction of the arrow in said figure. Fig. 6 is a plan view, the dial-plate and pointer having been removed. Fig. 7 is a horizontal section on line $y\,y$, Fig. 2, looking in the direction of the arrow in said figure. Fig. 8 is a plan view showing, detached and inverted, the retaining-ring and the annuli for indicating the distance traveled. Fig. 9 is a full vertical section, partly broken away, on line $z\,z$, Fig. 5.

My invention relates to improvements in mechanism or devices for indicating the speed of travel and distance traveled by bicycles or other wheeled vehicles.

The object of the invention is to provide a comparatively simple, compact, and convenient, as well as reliable, mechanism for these purposes.

The precise character of the invention will clearly appear from the following description, and the improvements will be particularly pointed out.

I shall proceed to describe first the mechanism whereby the speed of travel is indicated.

Referring to the accompanying drawings, 1 is the exterior casing, by which the mechanism is protected from dust and liability to injury.

2 is the frame, in which the mechanism is mounted.

3 is a horizontal shaft that is journaled in a side of the frame and in a U-shaped bracket 4, secured to the other side of the frame. This shaft, as hereinafter described, is adapted to be rotated in the direction of the arrow, Figs. 3 and 4, through suitable gears from the wheel of the bicycle or other vehicle to which the apparatus is attached.

5 are two similar bars on opposite sides of the shaft 3 and pivoted upon a pin 6, secured to and passing transversely through the shaft. These bars cross each other and stand normally at an acute angle to the shaft, as shown, and the shaft is cut away adjacent to the hub portion of these bars, so as to afford plane parallel bearing-surfaces for said bars. Upon the ends of the bars 5 are similar weights 7. Projecting from the sides, respectively, of two limbs of said bars, to one side of the pivot-pin 6 and on opposite sides of the shaft 3, are studs 8, that engage, respectively, lugs or projections 9 of a sliding yoke 10, whose horizontal limbs 11 extend parallel with said shaft and whose crown 12 lies in a longitudinal slit 13, Figs. 4 and 5, in the shaft 3, in which it (the yoke-crown) is adapted to slide and for a purpose hereinafter described. In the inner side of each of the limbs of the yoke, near their free extremities, is a notch 14, which engages a collar 15 upon shaft 3, upon which it (the collar) is adapted to slide longitudinally. 16 is an open helical compression-spring upon said shaft, one end of which bears against the said collar and the other end against a head or collar 17, fixed to the shaft. In the end portion of this shaft, which has the aforesaid slit 13, is a longitudinal aperture or socket 18, in which is entered a freely-sliding pin 19. The inner end of this pin is in contact with the yoke-crown and its outer end projects a short distance beyond the end of the shaft and through an opening in the vertical crown of the bracket 4. This end of said pin bears against the thin edge of a circular disk 20, fixed to a screw 21, that passes through a correspondingly-threaded hole in a vertical rock-shaft 22, which is pivoted at each end in bearings of the frame. To and near the upper end of this rock-shaft is secured a segment-gear 23, whose teeth engage those of a pinion 24 on a vertical arbor 25, that is suitably journaled in bearings of or connected to the top plate $2^t$ of the frame 2 and which arbor projects above said plate and extends through a central aperture in a suitably marked or graduated dial-plate 26. A pointer or index 27 is secured to the said arbor and extends over and adjacent to the dial-plate for the purpose of indicating speed in the manner explained in the description hereinafter given of the mode of operation of the mechanism now being described. 28 is a light coiled spring upon the said index-arbor, whose function is to tend to rotate the latter and so to tend to maintain the segment 23 at the extreme limit of its outward throw or movement, as seen in Fig. 7, and thus to obviate lost motion and keep the disk 20 in contact with the end of the sliding pin 19. It will of course be understood that the outer end of the said spring is fastened to the top plate $2^t$ and the other to the arbor 25.

Upon the projecting end of the shaft 3 is a gear 29, with which engages a gear 30, Figs. 1 and 2, that is secured to the wheel of the bicycle or other vehicle, whereby shaft 3 is driven.

The operation of the foregoing-described mechanism is as follows: When the bicycle (or other wheeled vehicle) is at rest, the index will point to the zero-mark on the dial-plate; but when it (the bicycle) is put in motion the shaft 3 will be rapidly rotated, whereupon by the centrifugal force the ends of the cross-bars 5 will fly outwardly, the bars turning on their pivot. The movement of said bars, whose studs 8 impinge against lugs 9 of the yoke 10, imparts a sliding motion to the latter, and consequently forces outwardly the pin 19. Owing to the previously-described connection of the yoke with the collar 15 the turning of the bars 5 on their pivot and the movement of the yoke are against the resistance of the spring 16 upon the shaft 3. The outwardly-sliding pin 19, bearing against the disk 20, rocks the vertical shaft 22 and through the segment and pinion gears causes the index to swing around a certain distance, according to the speed at which the bicycle is running, which speed obviously governs the extent of the movement of the pin 19.

It is manifestly highly important in a mechanism of the character and for the purpose described that there shall be as little friction as possible; also, that it shall be sensitive and capable of nice adjustments. To secure these ends, I locate the spring 16 upon shaft 3, as shown—that is, where it can act directly in a straight line upon the yoke, and consequently upon the cross-bars 5.

In order also to reduce to a minimum or practically neutralize friction between the rotating shaft 3 and the sliding pin 19, I prevent the latter from being carried around by the rotation of the said shaft by suitable means, in the present instance by a piece of wire 31, Figs. 2 and 5, that passes through the outer end of the pin and is bent so as to bear against the edges of the horizontal limbs of the bracket 4 and sliding thereon with the movement of the said pin.

As hereinbefore described, the pin 19 bears against the disk 20, and this disk is carried by a screw 21. The object in using a screw is to afford a convenient means for nicely adjusting the extent of the outward throw or movement imparted to the rock-shaft 22 by the sliding pin 19, as by turning the screw the distance from the contact-point of the disk and pin to the axis of the rock-shaft may be increased or shortened, and thus the extent of rocking motion of the said shaft, and so the throw of the index will be conversely diminished or increased.

The object of using the disk instead of a point for the pin 19 to bear against is to insure uniformity of distance between the contact-point and the axis of the screw 21, for the periphery of the disk being a true circle whose center is the axis of the screw this distance will always be the same.

The ends of the rock-shaft are respectively journaled in bearings or arms 32 33, pivoted to the top plate and bottom of the frame 2, respectively, whereby the said shaft may be adjusted laterally—that is, with relation to a vertical line. There is also a slight vertical play of the said shaft in its bearings in order to minimize friction.

The first constructed dial-plate having been suitably graduated or marked to indicate speed at the time of actual running of the bicycle at various speeds duplicates of this dial-plate may be made for use in connection with duplicates of the speed-indicating mechanism. There is, however, apt to be some unavoidable variation of the springs 16. Such variations, so far as the effect of the spring upon the cross-bars 5 and yoke 10 is concerned, may be corrected by suitable adjustments of the aforesaid screw 21, that carries the disk 20. Thus the speed indications of the duplicates will be substantially the same as those of the original dial-plate.

As it will sometimes be desirable to indicate only comparatively high speeds, as in racing, it will not usually be necessary to make changes in the size or strength of the spring 16 or other parts of the mechanism, as the proper regulation may be had by suitable adjustments of the length of the arm or screw 21.

It is preferred that the shaft 3 shall be horizontal; but with the weighted cross-bars pivoted to said shaft at their center of gravity (which is essential) the mechanism will operate successively in a vertical or horizontal position. When, however, the shaft is placed horizontally, the arms of the respective bars on one side of the pivot-pin and on opposite sides of the shaft may be dispensed with.

Having thus described the speed-indicating mechanism and its *modus operandi*, I shall now proceed to describe the mechanism for indicating and registering the distance traveled by the bicycle or other vehicle. As it is desirable that both of these indications may read within a close circumscribed place or plane and that the two mechanisms may be simultaneously operated from the same shaft,

I have devised the following construction and arrangement of the distance-registering mechanism with relation to the speed-indicating mechanism.

I provide a worm 34 on the driven shaft 3, with which engage the teeth of a pinion 35, carried by a vertical arbor 36, that is suitably journaled in bearings of the frame 2. On the upper end of the arbor is a worm 37, with which engage the teeth of a gear 38, that is journaled on a stud 39, projecting inwardly from the side of the frame. This gear has upon one side a tooth or projection 40, which at each revolution of gear 38 engages, consecutively, one of a series of ratchet-teeth 41 upon the under side of a rotatable annulus A', that in the present instance is concentric with the arbor that carries the index and rests upon the top plate $2^t$ of frame 2 and is held in place laterally without interfering with its rotary motion by means of a ring 42, that is secured to said top plate. In this instance the number of ratchet-teeth of the annulus is twenty-five, and the mechanism intervening between the annulus and the shaft is so proportioned that the rotation of the annulus a predetermined distance—that is, one step or tooth—occurs when the bicycle has traveled one twenty-fifth of a mile. The top of the annulus is accordingly divided off and marked to indicate from one to twenty-five twenty-fifths, the bicycle having traveled one mile at each complete revolution of the annulus. Within the latter is a second annulus $A^2$, whose function is to register one mile traveled at each step of its rotation and ten miles at each complete revolution. This annulus is supported upon the top plate $2^t$ by means of three bent flat springs 43, the upper ends of which are secured to the annulus, and the other or free ends rest directly upon said plate. The periphery of the annulus is provided with a series, ten in number, of teeth or projections 44.

Upon the upper surface of the top plate $2^t$ is a raised incline 45, and secured to the inner side of the annulus A' and projecting inwardly beyond the inner periphery thereof is a spring-pawl 46 with an upwardly-projecting tooth 47. When the first annulus A' is about to complete a revolution, the pawl 46 rides up the incline 45, Figs. 5, 6, and 9, and its tooth engages one of the projections of the second annulus $A^2$ and rotates the latter one step, indicating one mile traveled by the bicycle, the pawl then dropping down from the forward or vertical side of the incline, and thus is disengaged from the projection. The projections 44 are suitably marked upon the upper surface with figures indicating "1" to "10," inclusive. There may be a number of these toothed annuli similar to and lying within the annulus $A^2$ and each supported by springs 48, like those of the latter annulus, one of which is bent up at the end to form a tooth of a pawl similar to pawl 46 of the first annulus A'. In the present instance I employ two annuli (marked $A^3$ and $A^4$, respectively) within annulus $A^2$, each having ten projections 49 and 50, respectively, similar to those (44) of the second annulus; those of the one next the latter annulus being suitably numbered and indicating ten miles traveled at each step or movement, one hundred miles in a complete revolution, and the fourth or inner annulus $A^4$ is numbered and indicates one hundred miles traveled at each step of its rotation and one thousand miles in a full revolution.

The spring-pawl of the annulus $A^2$ operates at intervals upon the next annulus $A^3$ and that of $A^3$ upon annulus $A^4$, as seen in Fig. 9, in a manner similar to the operation of pawl 46 of annulus A' upon $A^2$, the incline 45 being of a width such as shown to act upon the several pawls at the time of a full revolution of the annulus by which it (the pawl) is carried.

The figures upon the projections of the annuli are read through a suitable slot 51 in the dial-plate 26, which plate is secured to the ring 42 and covers and aids in holding the annuli in place.

I usually mark lines and numerals upon the dial-plate to indicate miles per hour, and other lines and numerals thereon to indicate minutes per mile traveled by the bicycle. I also generally provide a protective covering over the dial-plate consisting of a glass plate $g$, Figs. 2 and 5, that is secured to the top of the casing.

Although I have described the details of construction of the mechanisms in which my invention is embodied and the particular construction and arrangement which thus far I have found to be most desirable, I do not limit myself to such special construction, as it will be obvious to those skilled in the art to which my invention pertains that the construction may be considerably varied without departing from the essential principles and mode of operation of the invention.

Having thus described my invention, I claim as new in mechanism or machines for indicating travel of bicycles or other wheeled vehicles and desire to secure by Letters Patent—

1. In a speed-indicator for bicycles, and other wheeled vehicles, the combination of the rotatable shaft adapted to be driven by the wheel of the vehicle, the spring-controlled cross-bars pivoted to the said shaft, the sliding part supported by the latter, connections between said part and cross-bars, whereby when the latter are moved outwardly on their pivot by centrifugal motion induced by the rotation of said shaft, an outward longitudinal movement will be imparted to the sliding part, means for preventing the rotation of said part, together with the rock-shaft and its arm against which latter the outer end of the said sliding part is adapted to bear, said arm being adjustable toward and away from the axis of said shaft, the index connected with said rock-shaft, and a spring adapted to always maintain the said arm of the rock-shaft in contact with the sliding part, substantially as set forth.

2. The combination of the rotatable shaft adapted to be driven by the wheel of a bicycle or the like, the spring-controlled bars pivoted thereto, the sliding pin, suitable connections between said pin and bars, the spring-controlled rock-shaft, an arm secured thereto against which said pin is adapted to impinge, means for adjusting said arm toward and away from the axis of the rock-shaft, the index-carrying arbor, and suitable connections between said rock-shaft and arbor; the construction and arrangement being substantially as described, whereby the movement of said pin is transmitted to the said arbor substantially as and for the purpose set forth.

3. The combination of the rotatable shaft adapted to be driven by the wheel of a bicycle or the like, the spring-controlled cross-bars pivoted thereto, the sliding pin supported by said shaft, the sliding yoke engaging studs or projections of said cross-bars, and also adapted to impinge against said pin, the rock-shaft, an arm secured thereto and adjustable toward and away from the axis thereof, against which the pin impinges, the segment-gear carried by said rock-shaft, the index-carrying arbor, the gear thereon engaging said segment, and the spring for controlling the arbor and its adjuncts or connections, all constructed and adapted to operate substantially as and for the purpose set forth.

4. The combination of the rotatable shaft adapted to be driven by the wheel of a bicycle or the like, the cross-bars pivoted to said shaft, the pin adapted to slide in the end of the shaft, the spring-controlled reciprocating yoke, having its crown impinging against said pin, and connected to said cross-bars substantially in the manner and by the means shown and described, the spring-controlled rock-shaft, the index-carrying arbor, suitable gearing connecting said arbor and rock-shaft, together with the disk against whose edge the said sliding pin is adapted to bear and the adjusting, disk-carrying screw secured to said rock-shaft, substantially as and for the purpose set forth.

5. In mechanism of the character described, the combination of the rotatable shaft adapted to be driven by the wheel of a bicycle or other vehicle, the cross-bars pivoted to the said shaft, a sliding part carried by the said shaft and operatively connected with said cross-bars, the spring acting upon the said sliding part, the spring-controlled rock-shaft, the index-carrying arbor, suitable gearing connecting said arbor and rock-shaft, together with an arm secured to said rock-shaft and against which said sliding part is arranged to impinge, said arm being adjustable toward and away from the axis of the said rock-shaft, substantially as set forth.

6. The combination of the rotatable shaft adapted to be rotated by the wheel of a bicycle or the like, the arbor having the index secured thereto, mechanism substantially as described, whereby said index is caused, through the rotation of said driven shaft, to oscillate in correspondence with the speed of travel of the bicycle, or the like, and consequent speed of rotation of said shaft; together with a rotatable shaft, as 36, suitably geared to the last-mentioned shaft, a gear, as 38, a worm, 37, or the like, upon shaft, 36, engaging said gear, said gear having a tooth or projection; together with the rotatable annulus provided with teeth or projections with which the projection of the gear, 38, is adapted to consecutively engage, substantially as and for the purpose set forth.

7. In mechanism of the character described, the combination of the rotatable shaft adapted to be driven by the wheel of a bicycle or other vehicle, the cross-bars pivoted to said shaft, the sliding part carried by said shaft and operatively connected to said cross-bars, the spring arranged to act upon said sliding piece in opposition to the centrifugal action of the said cross-bars induced by the rotation of said shaft, the spring-controlled rock-shaft, an index-carrying arbor, suitable gearing connecting said arbor and rock-shaft, and an arm secured to said rock-shaft and against which the outer end of said sliding part is arranged to impinge, said arm being adjustable toward and away from the axis of the said rock-shaft, together with a distance-measuring device geared to the first-named shaft, substantially as set forth.

8. In mechanism of the character described, the combination with a sliding part, centrifugally-acting devices connected to said part to impart an endwise movement thereto in one direction, a spring arranged to act upon said sliding part in opposition to the action of the centrifugal devices, of an index-carrying arbor, a rock-shaft geared to said arbor, and an arm secured to said rock-shaft and forming a bearing for the said sliding part, said arm being adjustable toward and away from the axis of the said rock-shaft, substantially as set forth.

In testimony whereof I have hereunto affixed my signature in the presence of two subscribing witnesses.

WILLIAM E. STUBBS.

Witnesses:
   WALTER C. PUSEY,
   JOSHUA PUSEY.